Patented Aug. 14, 1945

2,382,753

UNITED STATES PATENT OFFICE 2,382,753

CATALYTIC CONVERSIONS

Richard S. Treseder, San Francisco, Calif., assignor to Shell Development Company, San Francisco, Calif., a corporation of Delaware No Drawing. Application January 29, 1944,
Serial No. 520,339

13 Claims. (Cl. 260—666)

This invention relates to the execution of catalytic reactions with the aid of Friedel-Crafts-type catalysts and relates more particularly to the catalytic conversion of hydrocarbons with the aid of catalysts comprising an active, liquid, metal halide-hydrocarbon complex.

In the execution of catalytic conversions on a practical scale with the aid of Friedel-Crafts-type catalysts it is often desirable and sometimes imperative that catalysts employed be of the type comprising the metal halide in the form of a hydrocarbon complex because of physical and chemical characteristics peculiar to these compounds. Catalysts comprising such a metal halide-hydrocarbon complex generally consist of a liquid, or sludge, obtained by mixing a metal halide with a hydrocarbon under suitable conditions resulting in the interaction of the metal halide with the hydrocarbon and/or decomposition products thereof. A catalyst of this type particularly suitable to the execution of hydrocarbon reactions comprises as the metal halide constituent a halide of aluminum, for example, $AlCl_3$ and/or $AlBr_3$. Suitable hydrocarbons with which the aluminum halides are combined under conditions resulting in the desired hydrocarbon-metal halide complex comprise, for example, aromatic hydrocarbons such as benzene and toluene; hydrocarbon fractions such as aromatic kerosene extracts; cyclic olefins such as cyclohexene, cyclopentene and alkyl derivatives thereof; and paraffinic and olefinic hydrocarbons of straight or branched chain structure. In the preparation of the complex catalyst the hydrocarbon and the aluminum halide are subjected to an elevated temperature, for example, not substantially in excess of about 150° C., generally in the presence of an added hydrogen halide, for a sufficient length of time to result in the formation of a liquid or sludge consisting essentially of a metal halide-hydrocarbon complex. It is to be pointed out, however, that the present invention is in no wise limited by the method of production of the complex.

The aluminum halide-hydrocarbon complexes are particularly effective as catalysts in the execution of certain hydrocarbon conversions comprising, for example, isomerization, alkylation, condensation, etc., when utilized in the presence of a hydrogen halide such as, for example, HCl, HBr, HF, or alkyl halides, or materials capable of producing any of these hydrogen halide promoters under the condition of execution of the reaction. The halide constituent of the hydrogen halide promoter need not necessarily correspond with the halide constituent of the aluminum halide component of the hydrocarbon complex.

A characteristic distinguishing the aluminum halide-hydrocarbon complex catalysts from catalysts consisting essentially of aluminum halide per se or of aluminum halide in combination with a suitable support material, is the corrosive effect of the former upon metal-containing surfaces in the presence of hydrogen halides. In general, but little corrosion is encountered in reaction zones of processes utilizing a catalyst consisting essentially of aluminum halide per se, optionally in the presence of a suitable carrier material, or comprising an aluminum halide in combination with other metal halides. The aluminum halide-hydrocarbon complex catalysts in the presence of hydrogen halide promoters, on the other hand, are generally of such a corrosive nature that the difficulties encountered in their utilization often seriously detract from the advantages otherwise inherent in their use on a practical scale. It is believed that the inordinate corrosive effect of the aluminum halide-hydrocarbon complex in the presence of a hydrogen halide may be due to at least a substantial degree to the presence of dissociated hydrogen halide in the complex. Thus, when utilizing a hydrogen chloride promoter, it has been found that the aluminum chloride-hydrocarbon complex will generally comprise about 5% by weight of hydrogen chloride. The catalysts are generally prepared in the presence of added hydrogen halide and are thus saturated with respect to the promoter prior to contact with the reactants. When utilizing a catalyst prepared in the absence of hydrogen halide, the catalyst will remove the hydrogen halide promoter from the reactants substantially as fast as it is introduced into the reaction zone until saturation of the catalyst with respect to the hydrogen halide has been achieved. The complex catalysts are particularly corrosive to steel and iron- or ferrous-metal-containing materials of which the apparatus in which the processes are executed must generally be manufactured. Such corrosive effect, it must be pointed out, not only results in a rapid deterioration of costly apparatus but in a rapid decline in the useful life of the metal halide-hydrocarbon complex catalyst, thereby further increasing the cost of the operation. Though it is not intended to limit the invention by any theories advanced herein to set forth more clearly the nature of the invention, it is believed that such increased rate in the decrease of the catalyst life is often due, at least in part, to the rapid increase of iron in the catalyst as a result of the latter's corrosive effect upon the ferrous metal-containing surfaces in contact therewith. The effect of a relatively high concentration of iron on the life of these catalysts is illustrated by the following example.

*Example I*

A dimethylcyclopentane-containing fraction of straight run gasoline having a boiling range of from 85° C. to 98° C. was treated with a catalyst consisting of an AlCl₃-toluene complex under the following conditions:

| | |
|---|---|
| Temperature | °C__ 80 |
| Contact time | minutes__ 17 |
| Catalyst to hydrocarbon ratio | 1:3 |

Hydrogen chloride in the amount of 0.1% by weight was added to the charge. The operation was discontinued when the catalyst activity had dropped to 50% of the equilibrium conversion of dimethylcyclopentane to methylcyclohexane. Under these conditions 106 gallons of the hydrocarbon charge were treated per pound of AlCl₃ in the catalyst. In a second operation a separate portion of the same feed was treated under identical operating conditions with a separate portion of the same catalyst in which iron in an amount of 6% by weight of the catalyst had been dissolved. The amount of hydrocarbon charge treated per pound of AlCl₃ in the catalyst in the second operation amounted to only 78 gallons.

Certain metals, for example, nickel and alloys are available which are not so readily corroded by the complex catalyst as the ferrous metal-containing materials. The cost of these materials, however, generally prohibits their use in practical installations, and even though attacked to a lesser degree by the complexes than ferrous metals they are nevertheless seriously corroded over prolonged periods of contact with these catalysts. Resort to expedients such as the coating of the metal surfaces in contact with the catalyst is generally found to be impractical and costly. Many of the available coating materials such as, for example, plastics, are often found to deteriorate and crack after relatively short time of use, thereby entailing additional costs as well as a serious loss of time required to effect the necessary repairs.

It has now been found that corrosion of metal-containing surfaces in contact with a catalyst comprising an aluminum halide-hydrocarbon complex, utilized in the conversion of hydrocarbons in the presence of a hydrogen halide promoter, can be suppressed effectively by maintaining in the catalyst a halide of an alkali or alkaline earth metal; and that maintenance in the complex catalyst of the concentration of the added alkali or alkaline earth metal halide within a well-defined range enables the complete suppression of any substantial degree of corrosion without adversely affecting the efficiency of the catalyst as determined by yield of desired conversion product per pound of aluminum halide in the catalyst.

The halides of the alkali and alkaline earth metals are not necessarily entirely equivalent in their corrosion inhibiting effect, their comparative efficiency in this regard being to some extent determined by the particular operating conditions used, the composition of the particular catalyst employed and the composition of the metal surface in contact with the catalyst. Although the maintenance in the catalyst of relatively small amounts of the corrosion inhibitors, for example, in amounts less than about 3% by weight of the complex catalyst, will result in substantial inhibition of the corrosive effect of the catalyst and may be resorted to within the scope of the invention, it is nevertheless, preferred to maintain the concentration of the added alkali metal halide and/or alkaline earth metal halide in the catalyst sufficiently high to effect complete suppression of any substantial corrosion. The halides of the alkali and alkaline earth metals possess appreciable solubility in the complex catalysts. In general, complete suppression of any substantial corrosive effect in the presence of a hydrogen halide promoter is obtained by utilizing as catalyst a metal halide-hydrocarbon complex which is saturated with respect to the inhibitor at the conditions of execution of the process. In the utilization of an aluminum chloride-hydrocarbon complex in the presence of a hydrogen chloride promoter, complete inhibition of any substantial corrosion upon most metal-containing surfaces comprising, for example, steels and nickel, is obtained by maintaining a concentration of sodium chloride and/or calcium chloride in the catalyst of from about 9% to about 13% by weight of the catalyst. The concentration of a particular alkali metal halide and/or alkaline earth metal halide required to obtain complete suppression of any substantial corrosion will vary somewhat from one halide inhibitor to another. In general, the maintenance of a concentration of the alkali metal halide and/or alkaline earth metal halide in the complex of from about 3% to about 20% and preferably of from about 5% to about 15% is satisfactory. Inclusion of the inhibitor halides in the catalyst in amounts exceeding the prescribed range, though still effecting reduction of corrosive effect often results in a reduction of yield of desired conversion products per pound of aluminum chloride in the catalyst and introduces further disadvantages such as, for example, mechanical difficulties in handling of the catalyst within the system, which are found to increase relatively proportionately with increase in concentration of inhibitor above that required to attain substantially complete suppression of corrosive effect of the catalyst.

Of the halides of the alkali and alkaline earth metals, the halides of sodium and calcium, particularly the chlorides thereof, are somewhat preferred. Although it is generally preferred to utilize an alkali or alkaline earth metal halide the halide constituent of which corresponds to that of the halide constituent of the aluminum halide in the complex, it is not necessary that these halide constituents of the inhibitor and of the catalyst correspond. For example, when utilizing an aluminum chloride-hydrocarbon complex catalyst the alkali or alkaline earth metal can be added in the form of either the chloride, bromide or fluoride; or it may be added as a mixture of any two or more of such of halide atoms; or it may be added as a mixture of any two or more of such halide salts. In general, it will be preferred to effect the inclusion of but one alkali or alkaline earth metal halide in the catalyst. The halide of more than one alkali or alkaline earth metals may, however, be used and the halide constituents thereof need not necessarily correspond.

Attainment of optimum results in accordance with the invention requires the addition of the alkali metal and/or alkaline earth metal as a halide salt and will not be attained by the addition of the elements per se. Though the addition of the element per se will ultimately result in its conversion to some extent to the halide salt in the presence of the hydrogen halide promoter, the corrosion encountered during this initial phase of the process, as well as the detrimental effect upon the behavoir of the catalyst, will generally seriously impair the efficiency of the process.

The halide inhibitors may be introduced into the complex catalyst in any suitable manner before utilization of the catalyst in the process. They may be introduced during or after the manufacture of the catalyst. They may be introduced into the catalyst in solid form, as a slurry or suspension in a suitable liquid medium, or as a solution in a suitable solvent. Since the corrosion inhibitors of the present invention generally have a greater solubility in the complex catalyst than in the hydrocarbons treated therewith, relatively little of them will be lost by entrainment with reactants from the catalyst. Addition of the inhibitors to the catalyst is, however, made during the course of the operation when necessary to maintain the concentration thereof within the prescribed range, for subjection of the metal-containing surfaces to contact with the corrosion inhibitor-containing catalyst will in no wise avoid subsequent corrosion by contact with the aluminum halide-hydrocarbon complex in the presence of a hydrogen halide and in the absence of the corrosion inhibitor.

The following example is given to illustrate the substantial degree to which corrosion of metal-containing surfaces by catalysts comprising aluminum halide-hydrocarbon complexes, in the presence of a hydrogen halide, is inhibited by maintaining in the catalyst a halide of an alkali metal or of an alkaline earth metal.

Example II

Polished metal surfaces of low carbon steel and nickel were suspended for 24 hours in separate portions of an aluminum chloride-hydrocarbon complex, obtained by the interaction of anhydrous aluminum chloride and an aromatic extract of kerosene, and maintained at a temperature of 100° C. The catalyst was agitated by means of a stirrer and hydrogen chloride was bubbled therethrough throughout the test. In a series of separate tests similar metal surfaces were contacted under identical conditions with separate portions of the same complex catalyst to which sodium chloride or calcium chloride in the amounts given in the table below had been added. The corrosion rates of the metal surfaces were carefully determined and are given in the following table for each of the individual tests in mils penetration per year.

| Inhibitor percent of complex by weight | Corrosion rate mils per year | |
| --- | --- | --- |
| | Low carbon steel | Nickel |
| None | 5,200 | 800 |
| 6.0% NaCl | 220 | |
| 9.0% NaCl | 150 | 160 |
| 12.0% NaCl | 16 | 4 |
| 12.0% CaCl₂ | 5 | 2 |

An essential characteristic of a suitable corrosion inhibitor must be the absence of any substantial adverse effect upon the behavoir of the catalyst. In this respect the halides of the alkali and alkaline earth metals when utilized within the above prescribed range of concentration possess the advantage of having substantially no harmful effect upon either the activity or the useful life of the complex catalyst. This is exemplified by the following example.

Example III

A naphthenic straight run methylcyclopentane-containing fraction was treated with an active, liquid, aluminum chloride-hydrocarbon complex containing a corrosion inhibiting amount of calcium chloride and having the following composition.

| | Per cent by weight |
| --- | --- |
| AlCl₃ | 47.3 |
| CaCl₂ | 8.5 |
| HCl | 5.0 |
| Aromatic kerosene extract | 39.2 |

The treatment was effected under the following condition:

Temperature ° C 115
Time of contact minutes 24
HCl added to the hydrocarbon feed per cent by weight of feed 1
Catalyst to hydrocarbon ratio by volume 1:1

The operation was terminated when the activity of the catalyst had declined to a point where the conversion of methylcyclopentane to cyclohexane had dropped to 75% of equilibrium conversion. Under these conditions about 135 pounds of hydrocarbon feed were treated per pound of aluminum chloride in the catalyst. Corrosion to any substantial degree of the ferrous metal-containing surface in contact with the catalyst was entirely absent.

The operation was repeated with a separate portion of the same feed under identical operating conditions with the exception that no calcium chloride was present in the aluminum chloride-hydrocarbon complex catalyst. The amount of hydrocarbon feed treated per pound of aluminum chloride in the catalyst amounted to about 135 pounds of hydrocarbon feed per pound of aluminum chloride in the catalyst.

The invention thus provides a highly efficient method for the elimination of the severe difficulties heretofore encountered in the utilization of metal halide-hydrocarbon complex catalysts as a result of the corrosive action of these catalysts upon metal surfaces in contact therewith, thereby enabling the attainment not only of a substantial increase in the life of the equipment and the useful life of the catalyst but the substantial savings and reduction in cost of operation resulting therefrom. A particular advantage of the invention resides in the utilization, as the corrosion inhibitor component of the catalyst, of materials which are not only readily available but inexpensive and devoid of any possible hazards in connection with their use A still further advantage of the non-corrosive catalysts of the present invention resides in the substantial insolubility of the corrosion inhibitor component thereof in hydrocarbons, thereby obviating any need for continuous addition of the inhibitor during the course of operation or removal and recovery of the inhibitor from the products

I claim as my invention:

1. In a catalytic hydrocarbon conversion process wherein hydrocarbons are converted in the presence of a catalyst consisting essentially of an active liquid aluminum chloride-hydrocarbon complex in the presence of hydrogen chloride in a conversion zone comprising a metal-containing surface in direct contact with said catalyst, the method of inhibiting any substantial corrosion of said metal-containing surface which comprises maintaining in said catalyst throughout the operation from about 5% to about 15% by weight of sodium chloride.

2. In a catalytic hydrocarbon conversion process wherein hydrocarbons are converted in the presence of a catalyst consisting essentially of an active liquid aluminum chloride-hydrocarbon complex in the presence of hydrogen chloride in a conversion zone comprising a metal-containing surface in direct contact with said catalyst, the method of inhibiting any substantial corrosion of said metal-containing surface which comprises maintaining in said catalyst throughout the operation from about 5% to about 15% by weight of calcium chloride.

3. In a catalytic hydrocarbon conversion process wherein hydrocarbons are converted in the presence of a catalyst consisting essentially of an active liquid aluminum chloride-hydrocarbon complex in the presence of hydrogen chloride in a conversion zone comprising a metal-containing surface in direct contact with said catalyst, the method of inhibiting any substantial corrosion of said metal-containing surface which comprises maintaining in said catalyst throughout the operation from about 5% to about 15% by weight of a chloride of a metal of the alkali and alkaline earth metals.

4. In a catalytic hydrocarbon conversion process wherein hydrocarbons are converted in the presence of a catalyst consisting essentially of an active liquid aluminum chloride-hydrocarbon complex in the presence of hydrogen chloride in a conversion zone comprising a metal-containing surface in direct contact with said catalyst, the method of inhibiting any substantial corrosion of said metal-containing surface which comprises maintaining in said catalyst throughout the operation from about 5% to about 20% by weight of a halide of an alkaline earth metal.

5. In a catalytic hydrocarbon conversion process wherein hydrocarbons are converted in the presence of a catalyst consisting essentially of an active liquid aluminum chloride-hydrocarbon complex in the presence of hydrogen chloride in a conversion zone comprising a metal containing surface in direct contact with said catalyst, the method of inhibiting any substantial corrosion of said metal-containing surface which comprises maintaining in said catalyst throughout the operation from about 5% to about 20% by weight of a halide of an alkali metal.

6. In a catalytic hydrocarbon conversion process wherein hydrocarbons are converted in the presence of a catalyst consisting essentially of an active liquid aluminum chloride-hydrocarbon complex in the presence of hydrogen chloride in a conversion zone comprising a metal-containing surface in direct contact with said catalyst, the method of inhibiting any substantial corrosion of said metal-containing surface which comprises maintaining in said catalyst throughout the operation from about 5% to about 20% by weight of a chloride of a metal of the alkali and alkaline earth metals.

7. In a catalytic hydrocarbon conversion process wherein hydrocarbons are converted in the presence of a catalyst consisting essentially of an active liquid aluminum chloride-hydrocarbon complex in the presence of a hydrogen halide in a conversion zone comprising a metal-containing surface in direct contact with said catalyst, the method of inhibiting any substantial corrosion of said metal-containing surface which comprises maintaining in said catalyst throughout the operation from about 5% to about 20% by weight of a halide of a metal of the alkali and alkaline earth metals.

8. In a catalytic hydrocarbon conversion process wherein hydrocarbons are converted in the presence of a catalyst consisting essentially of an active liquid aluminum halide-hydrocarbon complex in the presence of a hydrogen halide in a conversion zone comprising a metal-containing surface in direct contact with said catalyst, the method of inhibiting any substantial corrosion of said metal-containing surface which comprises maintaining in said catalyst throughout the operation a halide of a metal of the alkali and alkaline earth metals in an amount below about 20% by weight of said aluminum halide-hydrocarbon complex.

9. In the execution of catalytic reactions wherein reactants are contacted with a catalyst consisting essentially of an active liquid aluminum halide-hydrocarbon complex in the presence of a hydrogen halide in a reaction zone comprising a metal-containing surface in direct contact with said catalyst, the method of inhibiting any substantial corrosion of said metal-containing surface which comprises maintaining in said catalyst throughout the operation a halide of a metal of the alkali and alkaline earth metals in an amount below about 20% by weight of said aluminum halide-hydrocarbon complex.

10. In a catalytic hydrocarbon conversion process wherein hydrocarbons are converted in the presence of a catalyst consisting essentially of an active liquid aluminum chloride-hydrocarbon complex in the presence of a hydrogen halide in a conversion zone comprising a metal containing surface in direct contact with said catalyst, the method of inhibiting any substantial corrosion of said metal-containing surface which comprises maintaining in said catalyst throughout the operation a corrosion inhibiting amount of sodium chloride.

11. In a catalytic hydrocarbon conversion process wherein hydrocarbons are converted in the presence of a catalyst consisting essentially of an active liquid aluminum chloride-hydrocarbon complex in the presence of hydrogen halide in a conversion zone comprising a metal-containing surface in direct contact with said catalyst, the method of inhibiting any substantial corrosion of said metal-containing surface which comprises maintaining in said catalyst throughout the operation a corrosion inhibiting amount of calcium chloride.

12. In a catalytic hydrocarbon conversion wherein hydrocarbons are converted in the presence of a catalyst consisting essentially of an active liquid aluminum halide-hydrocarbon complex in the presence of a hydrogen halide in a conversion zone comprising a metal-containing surface in direct contact with said catalyst, the method of inhibiting any substantial corrosion of said metal-containing surface which comprises maintaining in said catalyst throughout the operation a corrosion-inhibiting amount of a halide of a metal of the alkali and alkaline earth metals.

13. In the execution of catalytic reactions wherein reactants are contacted with a catalyst consisting essentially of an active liquid aluminum halide-hydrocarbon complex in the presence of a hydrogen halide in a reaction zone comprising a metal-containing surface in direct contact with said catalyst, the method of inhibiting any substantial corrosion of said metal-containing surface which comprises maintaining in said catalyst throughout the operation a corrosion-inhibiting amount of a halide of a metal of the alkali and alkaline earth metals.

RICHARD S. TRESEDER.